US012548923B2

(12) United States Patent
Saito

(10) Patent No.: US 12,548,923 B2
(45) Date of Patent: Feb. 10, 2026

(54) TERMINAL CONNECTION STRUCTURE

(71) Applicant: YAZAKI CORPORATION, Tokyo (JP)

(72) Inventor: Akihiro Saito, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 278 days.

(21) Appl. No.: 18/491,718

(22) Filed: Oct. 20, 2023

(65) Prior Publication Data

US 2024/0154325 A1 May 9, 2024

(30) Foreign Application Priority Data

Nov. 7, 2022 (JP) ................................ 2022-178338

(51) Int. Cl.
*H01R 4/34* (2006.01)
*B60L 53/16* (2019.01)
*H01R 13/42* (2006.01)

(52) U.S. Cl.
CPC ................ *H01R 4/34* (2013.01); *B60L 53/16* (2019.02); *H01R 13/42* (2013.01)

(58) Field of Classification Search
CPC .......... H01R 4/34; H01R 13/42; H01R 11/12; H01R 13/40; H01R 13/502; H01R 13/58; B60L 53/16; B60L 53/11
See application file for complete search history.

(56) References Cited

U.S. PATENT DOCUMENTS

| | | | | |
|---|---|---|---|---|
| 9,653,843 | B2 * | 5/2017 | Suzuki ................. | H01R 13/506 |
| 10,062,974 | B2 * | 8/2018 | Okamoto ................. | H01R 4/34 |
| 2018/0019535 | A1 | 1/2018 | Uenosono et al. | |
| 2018/0048091 | A1 | 2/2018 | Kawai et al. | |
| 2022/0094085 | A1 * | 3/2022 | Kitaoka ................... | H01R 4/30 |

FOREIGN PATENT DOCUMENTS

| | | | |
|---|---|---|---|
| JP | S61-248378 | A | 11/1986 |
| JP | H06-333652 | A | 12/1994 |
| JP | 2012-230764 | A | 11/2012 |
| JP | 2013-8565 | A | 1/2013 |
| JP | 2018-10787 | A | 1/2018 |
| JP | 2018-26286 | A | 2/2018 |
| JP | 2022-50114 | A | 3/2022 |

* cited by examiner

*Primary Examiner* — Briggitte R. Hammond
(74) *Attorney, Agent, or Firm* — KENEALY VAIDYA LLP

(57) ABSTRACT

A terminal connection structure includes a housing having a plurality of terminal accommodating chambers, a terminal accommodated in each of the terminal accommodating chambers, and a terminal-equipped electric wire in which a connection terminal connected to end portion of an electric wire is electrically connected to an electric wire connection portion of the terminal. A connection portion of the electric wire connection portion to which the connection terminal is connected is shifted relative to a central axis of electric connection portion of the terminal.

2 Claims, 13 Drawing Sheets

TERMINAL CONNECTION STRUCTURE

CROSS-REFERENCE TO RELATED APPLICATIONS

This application is based on and claims priority under 35 USC 119 from Japanese Patent Application No. 2022-178338 filed on Nov. 7, 2022, the contents of which are incorporated herein by reference.

TECHNICAL FIELD

The present invention relates to a terminal connection structure.

BACKGROUND ART

A charging inlet (connector) installed in a vehicle such as an electric vehicle or a plug-in hybrid electric vehicle has been used in the related art to supply (charge) electric power from outside the vehicle to a battery installed in the vehicle.

This type of charging inlet includes two power supply lines (power line and ground wire) and a plurality of signal lines accommodated in a housing. Each of the power supply lines and the signal lines has a terminal connection structure including a terminal-equipped electric wire in which a terminal fitted to a counterpart terminal is connected to an end portion of an electric wire (see Patent Literature 1).

The terminal of the terminal-equipped electric wire and the electric wire are connected substantially coaxially with a terminal central axis for visibility during insertion into the housing and preventing buckling of the electric wire. For this reason, an inter-terminal pitch dimension is equal to an inter-electric wire pitch dimension according to a larger one of the terminal and the electric wire (including rubber plugs and housings of peripheral components) so that interference between components would not occur (that is, the inter-terminal pitch dimension is in close relation to the inter-electric wire pitch dimension). That is, when the inter-terminal pitch dimension is determined by, for example, a charging standard and an opening shape of a counterpart housing, the inter-electric wire pitch dimension is also determined according to the inter-terminal pitch dimension.

In a terminal-equipped electric wire applied to a wire harness or the like used in a vehicle, an electric wire connection portion of a terminal electrically connected to an electric wire is shifted relative to an electric connection portion of a terminal (connection terminal) electrically connected to a connection partner (see Patent Literature 2).

CITATION LIST

Patent Literature

Patent Literature 1: JP2018-10787A
Patent Literature 2: JP2022-50114A

SUMMARY OF INVENTION

To safely supply a large current to a battery of an electric vehicle and complete charging in a short time, a conductor having a relatively large cross-sectional area is used as an electric wire used for a power supply line. To increase a capacity of an installed power storage device and shorten the charging time, a large current and a large output are necessary.

However, when an electric wire is increased in diameter to increase the current and the output, a maximum electric wire diameter may be limited since electric wires interfere with each other. Conversely, when the electric wire diameter alone is made small for a small current and a small output (cost reduction, etc.), useless space may be created.

For example, when a connection terminal has a structure in which an electric wire connection portion is shifted relative to an electric connection portion as in Patent Literature 2 and an erroneous connection operation is caused on left and right sides when the connection terminal is connected to an end portion of an electric wire, the connection terminal is discarded, leading to a manufacturing loss.

The present invention is made in view of the above circumstances, and an object thereof is to provide a terminal connection structure that can individually set an inter-terminal pitch dimension and an inter-electric wire pitch dimension.

To achieve the above object, the terminal connection structure according to the present invention is characterized as follows. The terminal connection structure includes a housing having a plurality of terminal accommodating chambers, a terminal accommodated in each of the terminal accommodating chambers, and a terminal-equipped electric wire in which a connection terminal connected to end portion of an electric wire is electrically connected to an electric wire connection portion of the terminal. A connection portion of the electric wire connection portion to which the connection terminal is connected is shifted relative to a central axis of electric connection portion of the terminal.

According to the terminal connection structure of the present invention, an inter-terminal pitch dimension and an inter-electric wire pitch dimension can be individually set.

The present invention is briefly described above. Details of the present invention can be clarified by reading modes for carrying out the invention (hereinafter, referred to as "embodiments") described below with reference to the accompanying drawings.

DESCRIPTION OF EMBODIMENTS

Specific embodiments of the present invention will be described below with reference to the drawings.

Figure 1:
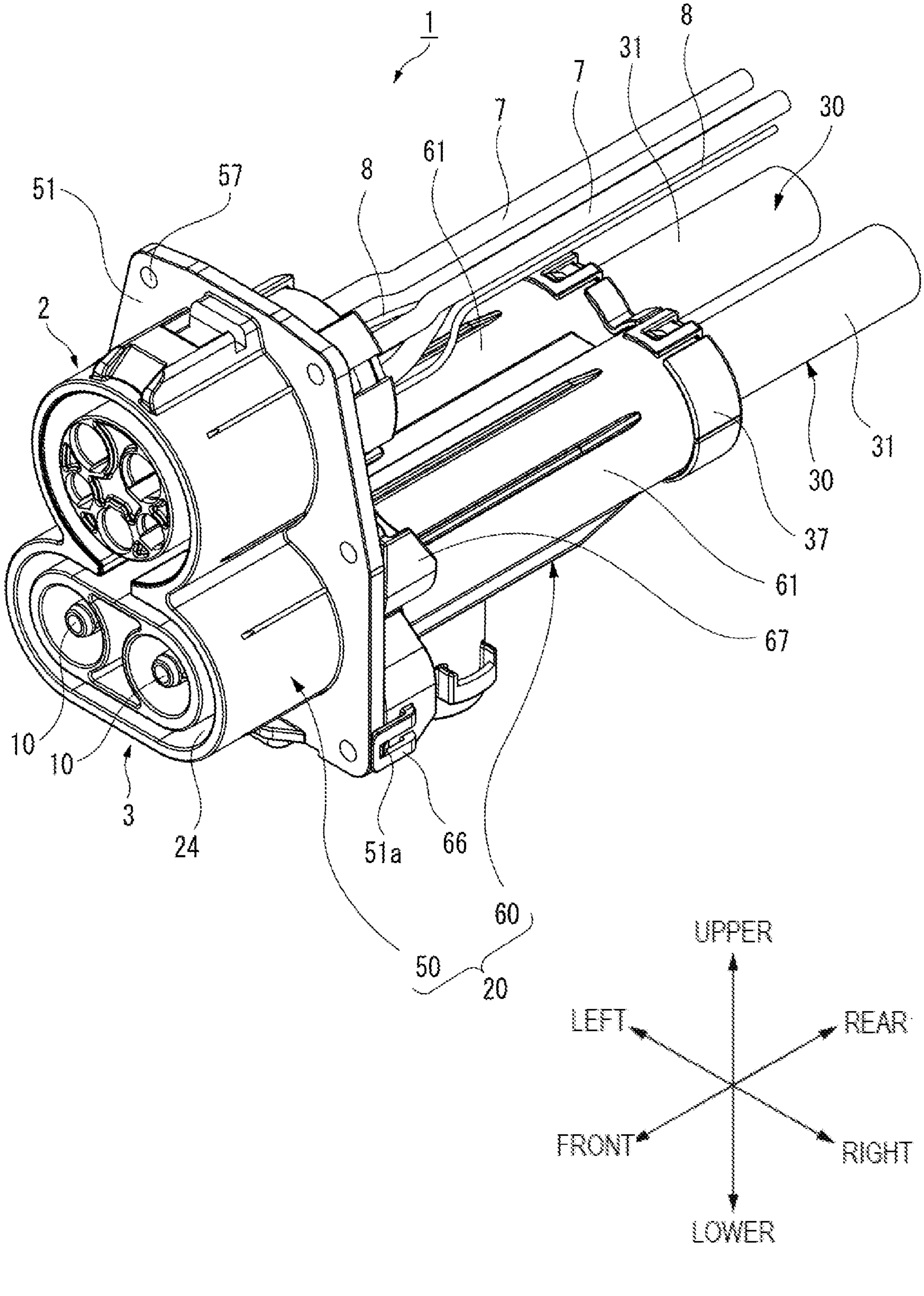
FIG. 1 is a perspective view of a charging inlet having a terminal connection structure as viewed from a front side according to an embodiment of the present invention.
Figure 2:
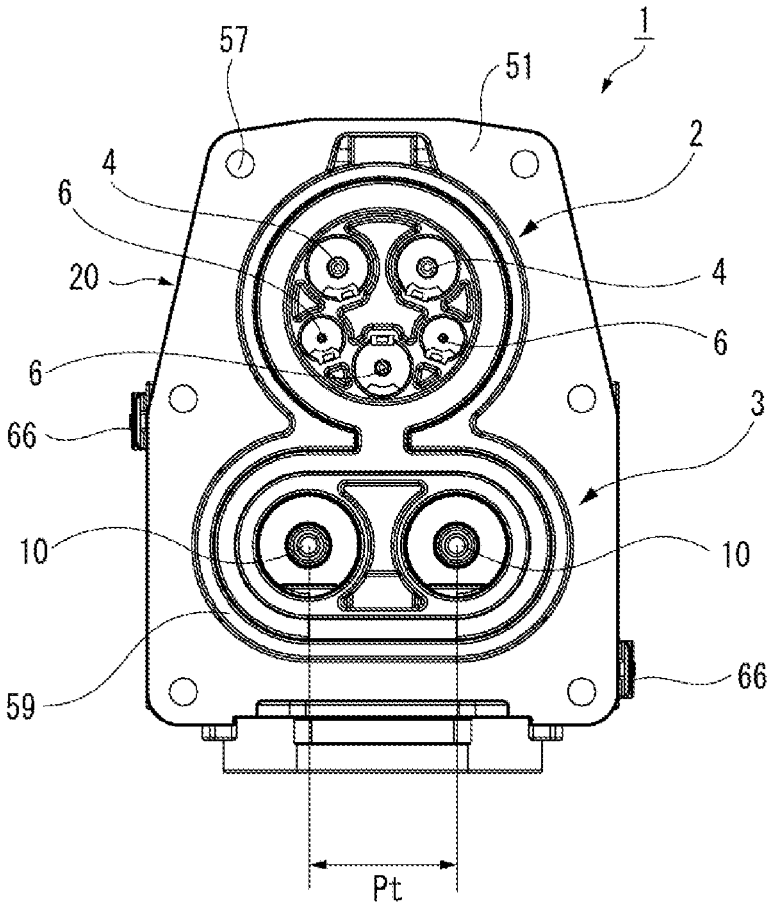
FIG. 2 is a front view of the charging inlet in FIG. 1.
Figure 3:
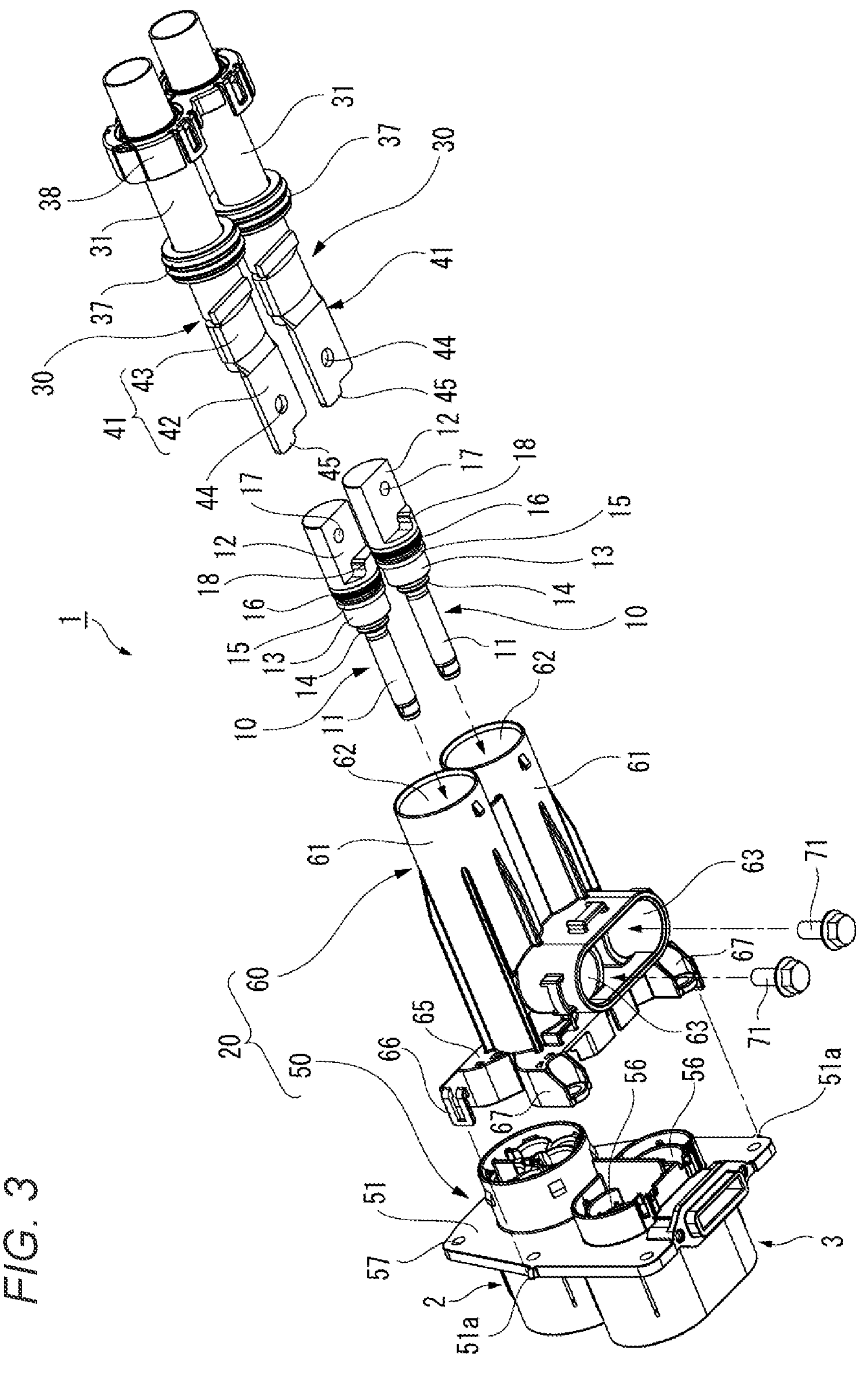
FIG. 3 is an exploded perspective view of the charging inlet in FIG. 1 as viewed obliquely from a rear lower side.

FIGS. 1 and 2 are a perspective view and a front view of a charging inlet 1 having a terminal connection structure according to an embodiment of the present invention. FIG. 3 is an exploded perspective view of the charging inlet 1 in FIG. 1 as viewed obliquely from a rear lower side. In the present specification, a front-rear direction, an upper-lower direction, and a left-right direction follow directions of arrows in FIG. 1.

The charging inlet 1 in FIGS. 1 and 2 is a connector assembled to a vehicle body of a vehicle such as an electric vehicle (EV) or a plug-in hybrid electric vehicle (PHEV) equipped with a battery. When the battery of the vehicle is charged, the charging inlet 1 is fitted with a power supply connector of a power supply device (not illustrated). In a state in which the power supply connector is fitted to the charging inlet 1, power is supplied from the power supply device to the vehicle to charge the battery.

The charging inlet 1 according to the present embodiment includes a first connector portion 2, a second connector portion 3, and a plurality of signal terminals 6 and power terminals 4 and 10 installed in the first connector portion 2 and the second connector portion 3 from a rear side.

For example, the plurality of signal terminals 6 connected to signal lines 8 and a pair of power terminals 4 connected to power lines 7 are inserted and installed in the first connector portion 2. For example, a pair of power terminals (terminals) 10 connected to power lines 31 are inserted and installed in the second connector portion 3.

As illustrated in FIG. 3, the charging inlet 1 includes a housing 20, the power terminals 10, and terminal-equipped electric wires 30.

The housing 20 according to the present embodiment includes a front housing 50 and a rear housing 60. The front housing 50 and the rear housing 60 are each formed of a synthetic resin. The rear housing 60 is assembled to the front housing 50 from a rear side of a portion constituting the second connector portion 3.

The front housing 50 includes an attachment flange 51 having bolt holes 57 and protruding to an outer peripheral side. The charging inlet 1 is attached to the vehicle by screwing attachment bolts (not illustrated) inserted into the bolt holes 57 of the attachment flange 51 into screw holes (not illustrated) of the vehicle.

The front housing 50 has a tubular shape. The front housing 50 includes a partition wall 53 on a rear side in an axial direction, so that an interior thereof is partitioned into front and rear portions by the partition wall 53 (see FIG. 10). The front housing 50 includes a front peripheral wall 54 on a front side of the partition wall 53 and a rear peripheral wall 55 on a rear side of the partition wall 53.

The rear housing 60 is assembled to an outer side of the rear peripheral wall 55 constituting the second connector portion 3 of the front housing 50. The front peripheral wall 54 of the front housing 50 is formed with fitting recesses 59 for fitting power supply connectors.

The partition wall 53 of the front housing 50 is provided with a pair of terminal holding portions 56. The power terminals 10 are inserted into the terminal holding portions 56 from a rear side of the front housing 50. Each of the terminal holding portions 56 is formed with a through hole 58 having a smaller diameter than the terminal holding portion 56 on a front side in an insertion direction of the power terminal 10. The power terminal 10 inserted into the terminal holding portion 56 includes an electric connection portion 11 inserted into the through hole 58 and includes a flange portion 13 abutting against an opening end of the terminal holding portion 56 and restricting forward movement.

The power terminal 10 according to the present embodiment is a charging terminal through which a charging current flows. The power terminal 10 is formed of a conductive metal material such as copper or a copper alloy, and is manufactured by cutting a round rod made of the conductive metal material. The power terminal 10 includes the electric connection portion 11 on a top end side to which a counterpart terminal (not illustrated) is connected, an electric wire connection portion 12 on a rear end side to which a connection terminal 41 of the terminal-equipped electric wire 30 is connected, and the flange portion 13 protruding toward an outer periphery over a circumferential direction between the electric connection portion 11 and the electric wire connection portion 12.

The electric connection portion 11 of the power terminal 10 has a circular rod shape, and is fitted to a terminal connection portion having a tubular shape of the counterpart terminal.

The electric wire connection portion 12 of the power terminal 10 has a semi-columnar shape, and has a bolt fastening hole 17 bored in a flat surface portion that is a connection portion to which the connection terminal 41 of the terminal-equipped electric wire 30 is connected. The bolt fastening hole 17 is shifted in the left-right direction relative to a central axis X2 of the electric connection portion 11 of the power terminal 10 (see FIG. 6). A shifting amount F of the bolt fastening hole 17 is set according to a desired inter-electric wire pitch dimension Pw between the pair of terminal-equipped electric wires 30.

A rotation stop portion 18 is formed on a flange portion 13 side of the flat surface portion in the electric wire connection portion 12. When the connection terminal 41 of the terminal-equipped electric wire 30 is bolt-fastened to the bolt fastening hole 17, the rotation stop portion 18 engages with an engagement projection 45 formed on the connection terminal 41 and prevents the connection terminal 41 from rotating together.

The electric connection portion 11 of the power terminal 10 is equipped with an O-ring 14 at a base thereof, and the flange portion 13 is equipped with a snap ring 15 and an O-ring 16. Accordingly, when the power terminal 10 is inserted into the terminal holding portion 56, the O-ring 14 seals a space between the power terminal 10 and the terminal holding portion 56.

The pair of power terminals 10 fitted into the terminal holding portions 56 from the rear side of the front housing 50 are accommodated in parallel in the fitting recesses 59 of the front housing 50 in a horizontal plane.

The terminal-equipped electric wire 30 according to the present embodiment includes the power line 31 connected to a battery of the vehicle and the connection terminal 41 electrically connected to an end portion of the power line 31.

Figure 10:
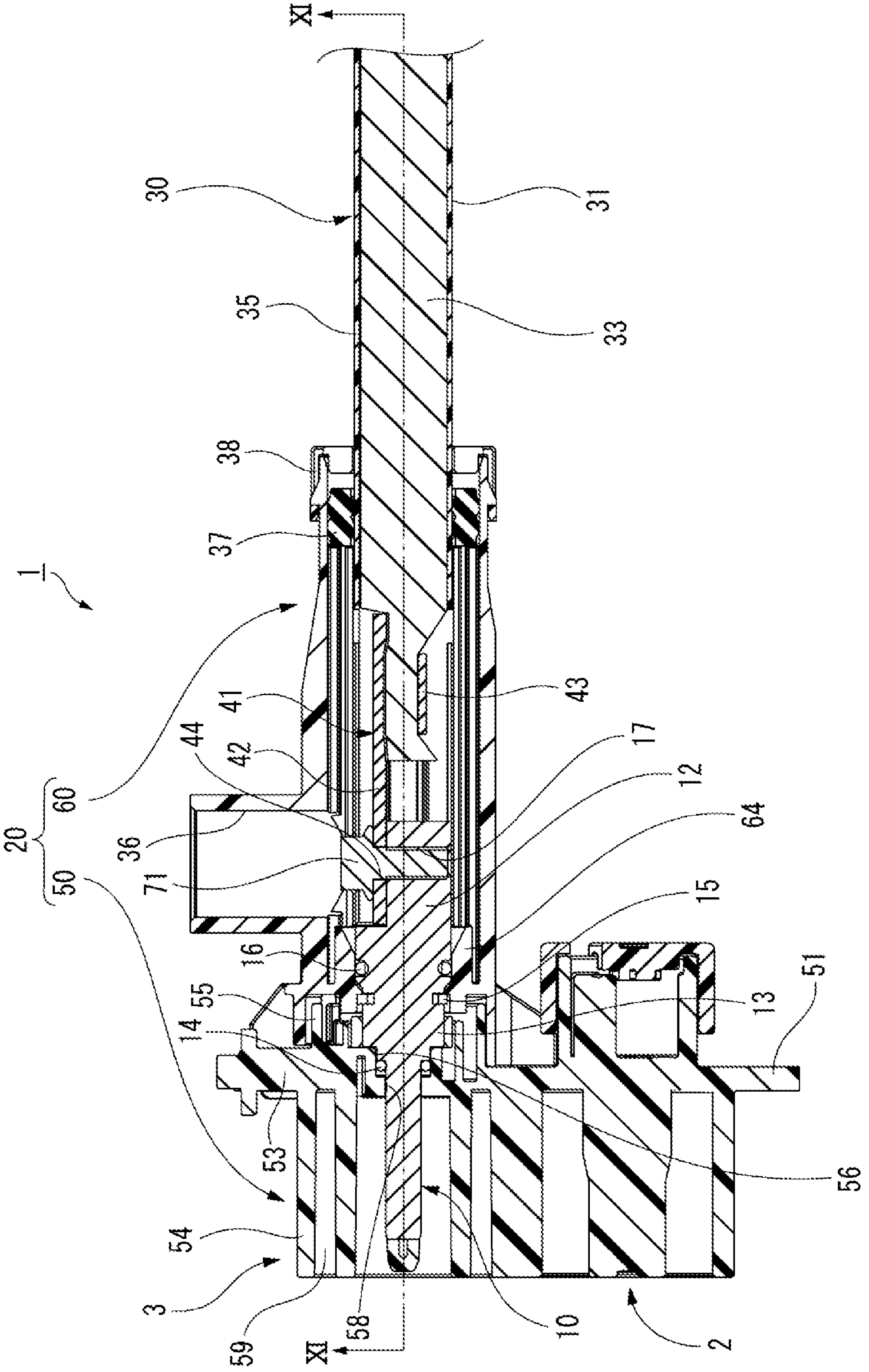
FIG. 10 is a cross-sectional view of the charging inlet in FIG. 9 taken along a line X-X.

The power line 31 is a coated electric wire including a linear conductor 33 and an insulating sheath 35 covering an outer side of the conductor 33, and a large current flows therethrough (see FIG. 10).

The connection terminal 41 includes a terminal connection portion 42 and an electric wire connection portion 43 in the front-rear direction, and is formed of a metal member integrally having conductivity.

The terminal connection portion 42 has a rectangular flat plate shape, and has a bolt through hole 44 bored in a plate thickness direction. The bolt through hole 44 penetrates the terminal connection portion 42 in a direction orthogonal to the upper-lower direction relative to a central axis X1 of the power line 31. The terminal connection portion 42 is formed with, at a top end, the engagement projection 45 that engages with the rotation stop portion 18 of the power terminal 10.

The conductor 33 exposed from the insulating sheath 35 at an end portion of the power line 31 is crimped and electrically connected to the electric wire connection portion 43. A connection structure of the connection terminal 41 to the power line 31 is not limited to crimping, and various known connection structures may be adopted.

The rear housing 60 is formed of an insulating synthetic resin. The rear housing 60 includes a pair of holder portions 61, each of which has a tubular shape and covers a connection position between the connection terminal 41 of the terminal-equipped electric wire 30 and the power terminal 10, service holes 63 provided in lower surfaces of the holder portions 61 corresponding to the connection positions, and an attachment portion 65 provided at front ends of the holder portions 61.

The connection position between the connection terminal 41 of the terminal-equipped electric wire 30 and the power terminal 10 is accommodated in a terminal accommodating chamber 62 defined in the holder portion 61, and the power line 31 of the terminal-equipped electric wire 30 is drawn out to a rear side from the terminal accommodating chamber 62 of the holder portion 61. The terminal accommodating chamber 62 of the holder portion 61 communicates with the terminal holding portion 56 of the front housing 50 when the rear housing 60 is assembled to the front housing 50.

On the power line 31 of the terminal-equipped electric wire 30 drawn out from the terminal accommodating chamber 62, a rubber plug 37 and a rubber plug holder 38 are installed in advance. The rubber plug 37 is fitted into the terminal accommodating chamber 62, and the rubber plug holder 38 is fixed to an end portion of the holder portion 61. Accordingly, the holder portion 61 from which the power line 31 is drawn out is waterproof by the rubber plug 37. If the rear housing 60 is not required to be waterproof, the rubber plug 37 fitted into the terminal accommodating chamber 62 of the holder portion 61 is not necessary.

The service holes 63 are tubular openings communicating with the terminal accommodating chambers 62. As to be described later, when a bolt fastening operation is performed between the connection terminals 41 of the terminal-equipped electric wires 30 inserted into the rear housing 60 and the power terminals 10, bolts 71 can be fastened by inserting a fastening tool from the service holes 63.

The attachment portion 65 of the rear housing 60 is provided with lock pieces 66 that are locked to locking portions 51*a* provided on the attachment flange 51 of the front housing 50, so that the rear housing 60 is positioned and fixed to the front housing 50. The attachment portion 65 of the rear housing 60 is further provided with attachment portions 67 that are fastened together with the attachment flange 51 of the front housing 50 by attachment bolts when the charging inlet 1 is attached to the vehicle.

Next, an assembling procedure of the charging inlet 1 having the terminal connection structure according to the present embodiment will be described.

Figure 4:
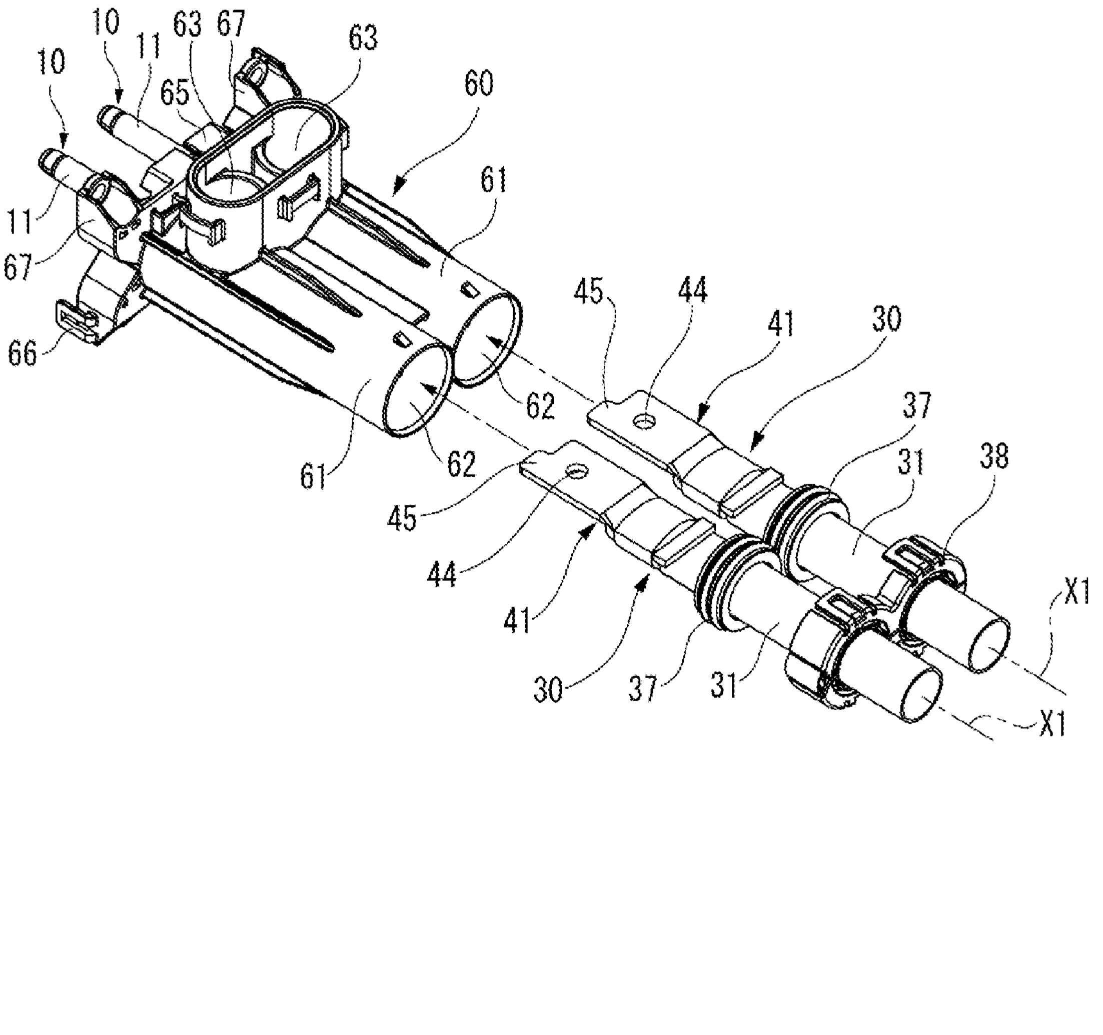
FIG. 4 is a perspective view illustrating a state in which terminals are accommodated in a rear housing in FIG. 3.
Figure 5:
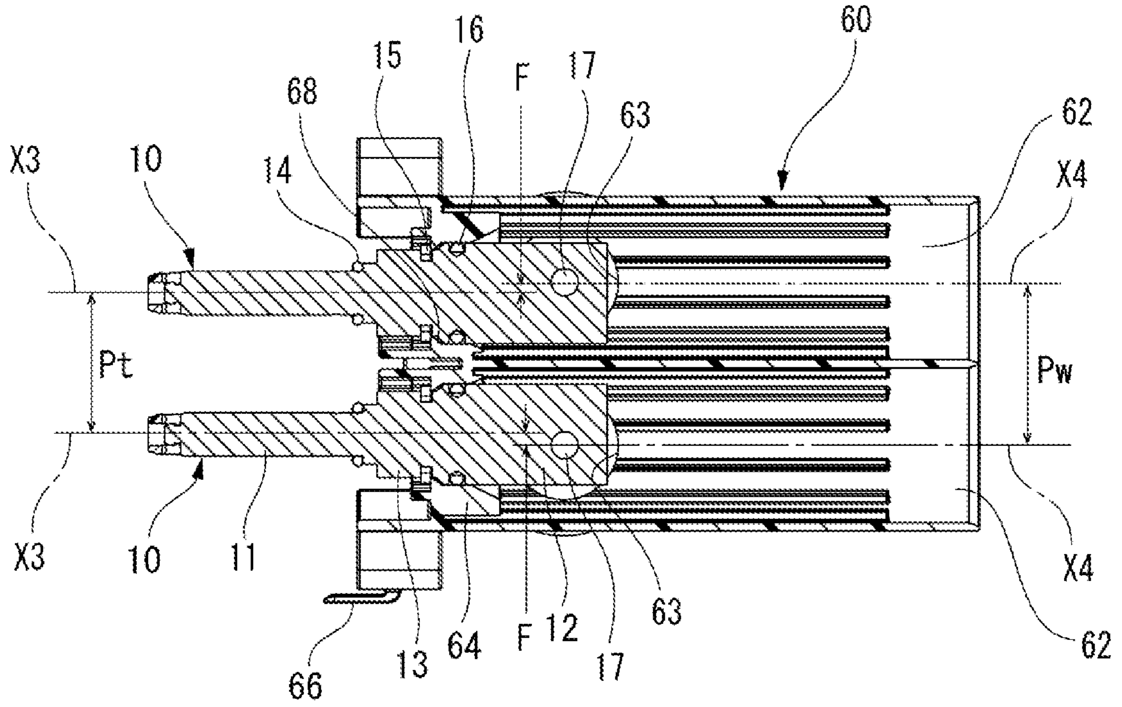
FIG. 5 is a horizontal cross-sectional view illustrating the state in which terminals are accommodated in the rear housing in FIG. 4.
Figure 6:
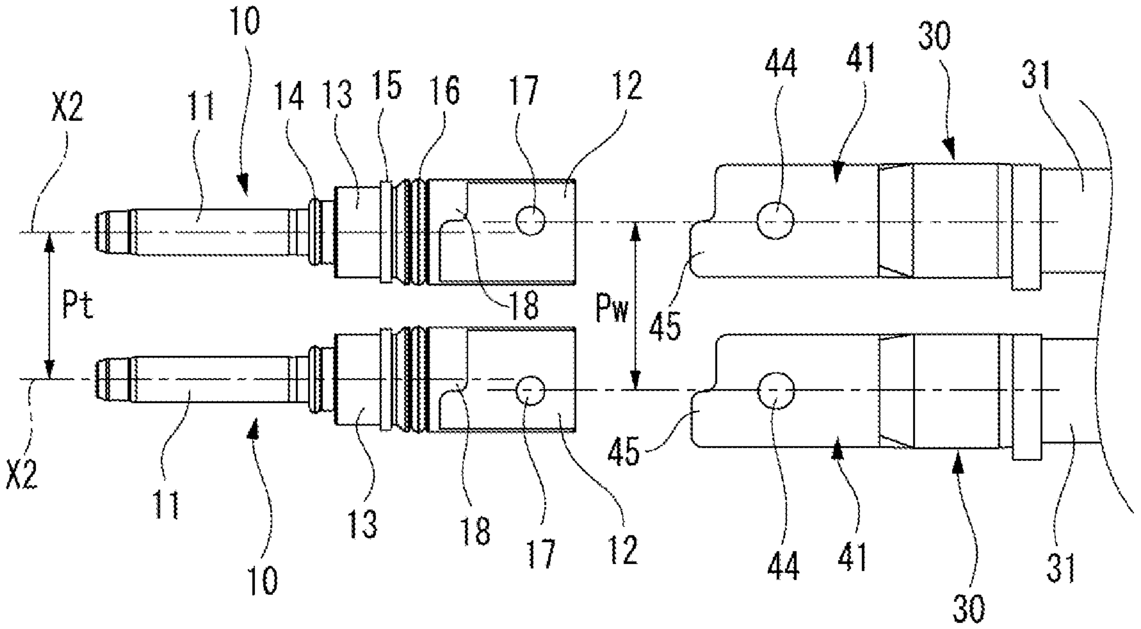
FIG. 6 is a plan view illustrating an inter-terminal pitch dimension of a pair of terminals and an inter-electric wire pitch dimension of a pair of terminal-equipped electric wires in FIG. 4.
Figure 7:
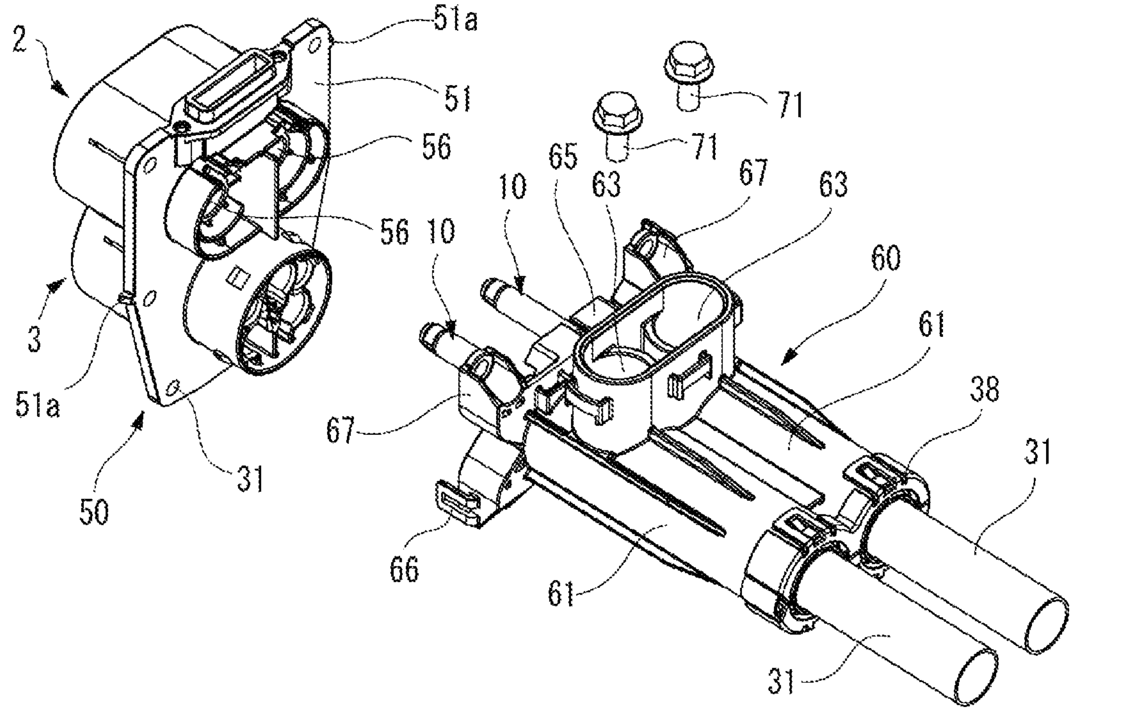
FIG. 7 is a perspective view illustrating a state in which the terminal-equipped electric wires are inserted into the rear housing in FIG. 4.
Figure 8:
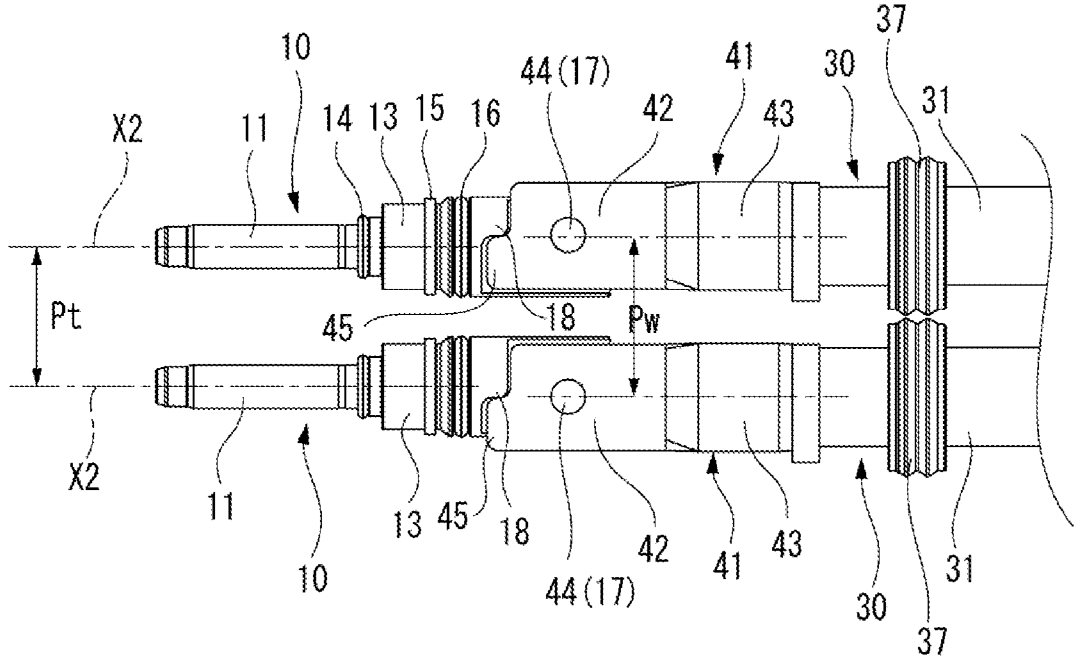
FIG. 8 is a perspective view of a main portion illustrating a state in which connection terminals of the terminal-equipped electric wires are overlapped on the terminals.

FIGS. 4 and 5 are a perspective view and a horizontal cross-sectional view illustrating a state in which the power terminals 10 are accommodated in the rear housing 60 in FIG. 3. FIG. 6 is a plan view illustrating an inter-terminal pitch dimension Pt of the pair of power terminals 10 and the inter-electric wire pitch dimension Pw of the pair of terminal-equipped electric wires 30 in FIG. 4. FIG. 7 is a perspective view illustrating a state in which the terminal-equipped electric wires 30 are inserted into the rear housing 60 in FIG. 4. FIG. 8 is a perspective view of a main portion illustrating a state in which the connection terminals 41 of the terminal-equipped electric wires 30 are overlapped on the power terminals 10.

First, as illustrated in FIGS. 4 and 5, the power terminals 10 are inserted into the respective terminal accommodating chambers 62 of the pair of holder portions 61 of the rear housing 60 from a rear side. The power terminals 10 inserted into the terminal accommodating chambers 62 are held by the rear housing 60 by retaining and locking the snap rings 15 to locking projections 68 of terminal holding portions 64 provided on front sides of the terminal accommodating chambers 62.

As illustrated in FIG. 5, an interval between central axes X3 of the pair of terminal holding portions 64 is the inter-terminal pitch dimension Pt of the pair of power terminals 10 defined by a charging standard. Accordingly, the pair of power terminals 10 are held by the terminal holding portions 64 of the rear housing 60 at the inter-terminal pitch dimension Pt.

Next, as illustrated in FIG. 7, the connection terminals 41 of the terminal-equipped electric wires 30 are inserted into the respective terminal accommodating chambers 62 of the pair of holder portions 61 of the rear housing 60 from a rear side. As illustrated in FIG. 8, the connection terminals 41 inserted into the terminal accommodating chambers 62 are inserted to overlap the electric wire connection portions 12 of the power terminals 10 held by the terminal holding portions 64.

Central axes of the connection terminals 41 of the terminal-equipped electric wires 30 coincide with the central axes X1 of the power lines 31, making it possible to prevent impairment of the visibility during the insertion operation into the terminal accommodating chambers 62 and prevent electric wire buckling.

As illustrated in FIG. 8, in the state in which the connection terminals 41 are overlapped on the power terminals 10, the pair of power terminals 10 held in the rear housing 60 and the pair of terminal-equipped electric wires 30 coincide with the bolt fastening holes 17, which are shifted outward in the left-right direction relative to the central axes X3 of the electric connection portions 11 of the power terminals 10, and the bolt through holes 44 of the connection terminals 41 of the terminal-equipped electric wires 30.

Figure 9:
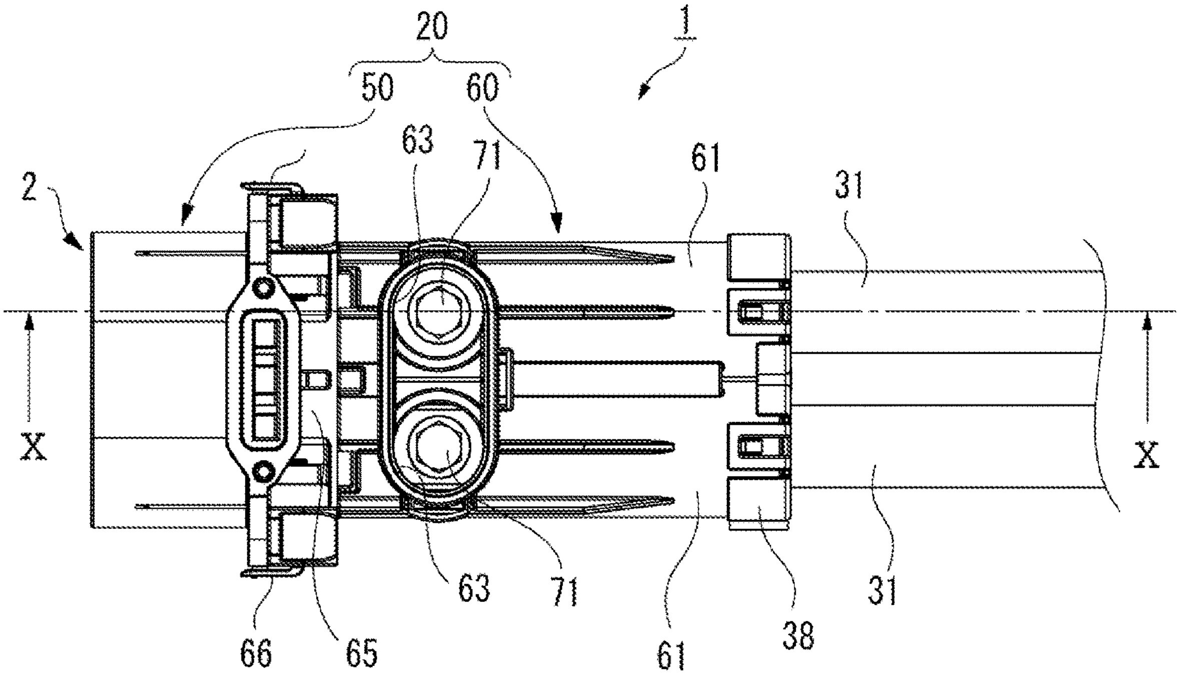
FIG. 9 is a bottom view of the charging inlet illustrating a state in which the terminals are connected with the connection terminals of the terminal-equipped electric wires.
Figure 11:
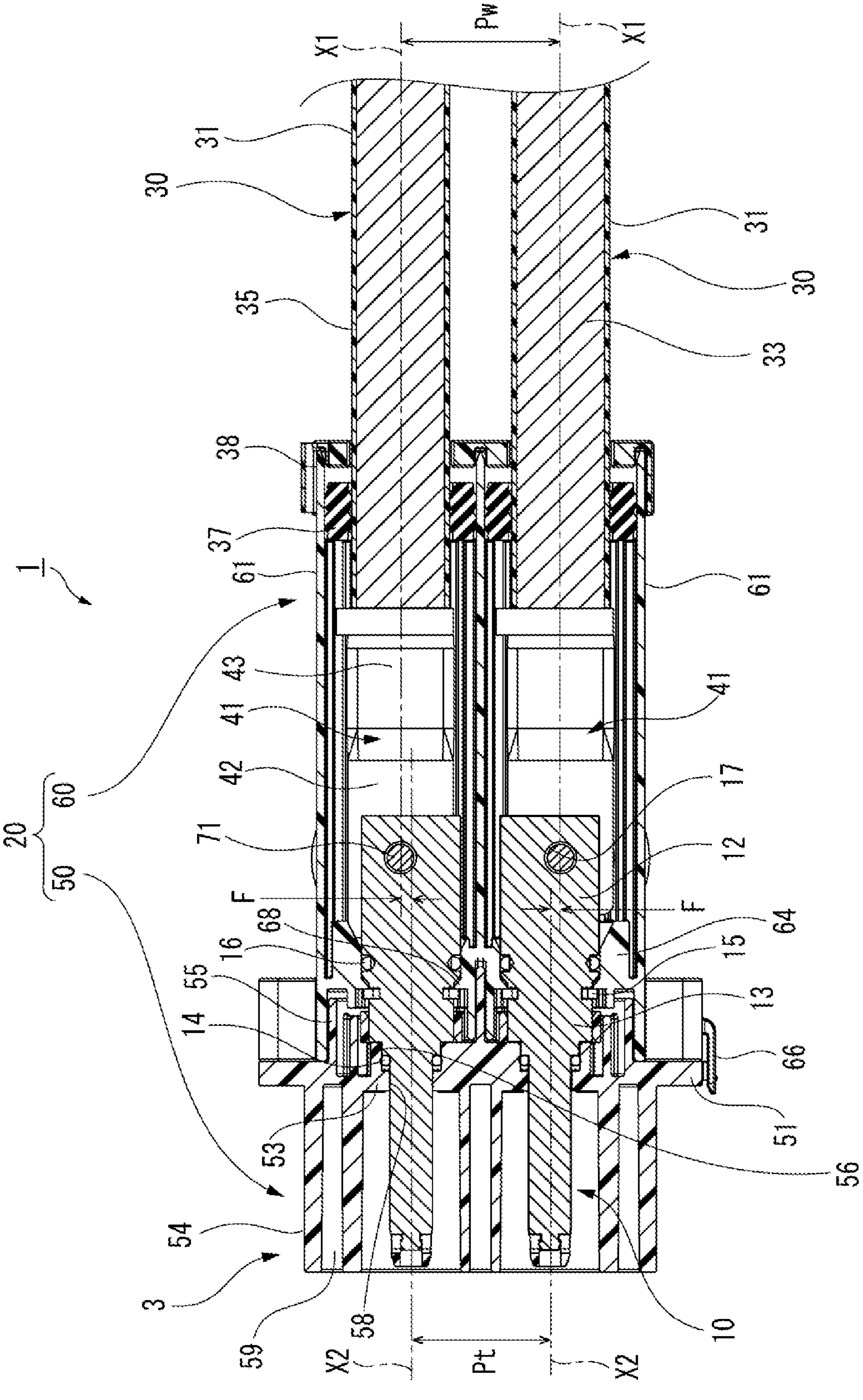
FIG. 11 is a cross-sectional view of the charging inlet in FIG. 10 taken along a line XI-XI.

FIG. 9 is a bottom view of the charging inlet illustrating a state in which the power terminals 10 are connected to the connection terminals. FIG. 10 is a cross-sectional view taken along a line X-X of the charging inlet in FIG. 9. FIG. 11 is a cross-sectional view taken along a line XI-XI of the charging inlet in FIG. 10.

As illustrated in FIG. 9, the power terminals 10 and the connection terminals 41 are bolt-fastened by the bolts 71. The bolt fastening operation between the power terminals 10 inserted into the rear housing 60 and the connection terminals 41 is performed by inserting a fastening tool from the service holes 63 provided in the rear housing 60 corresponding to the connection positions between the power terminals 10 and the connection terminals 41.

At this time, as illustrated in FIG. 8, the engagement projections 45 of the connection terminals 41 are engaged with the rotation stop portions 18 of the power terminals 10 and prevent co-rotation at the time of bolt fastening, and thus the bolt fastening operation is facilitated.

As illustrated in FIG. 5, an interval between central axes X4 of the terminal accommodating chambers 62 of the pair of holder portions 61 is the predetermined inter-electric wire pitch dimension Pw at which the power lines 31 of the terminal-equipped electric wires 30 do not interfere with each other. Accordingly, the power lines 31 of the pair of terminal-equipped electric wires 30 inserted into the terminal accommodating chambers 62 are held in the rear housing 60 with the inter-electric wire pitch dimension Pw larger than the inter-terminal pitch dimension Pt.

Next, the rear housing 60 is assembled to the front housing 50. The rear housing 60 is positioned and fixed by locking the lock pieces 66 of the attachment portion 65 to the locking portions 51*a* of the front housing 50.

The pair of power terminals 10 held by the rear housing 60 are inserted into the terminal holding portions 56 of the front housing 50, and the electric connection portions 11 are inserted into the through holes 58.

As illustrated in FIG. 10, the power terminals 10 are electrically connected with the connection terminals 41 bolt-fastened by the bolts 71. After the bolt fastening operation, the service holes 63 are closed by a lid member (not illustrated).

As illustrated in FIG. 11, according to the charging inlet 1 having the terminal connection structure according to the present embodiment, the bolt fastening holes 17, which are the connection portions of the electric wire connection portions 12 of the power terminals 10 to which the connection terminals 41 are connected, are shifted in the left-right direction relative to the central axes X2 of the electric connection portions 11 of the power terminals 10. Accordingly, the inter-terminal pitch dimension Pt of the pair of power terminals 10 and the inter-electric wire pitch dimension Pw of the pair of terminal-equipped electric wires 30 can be individually set.

That is, even when the inter-terminal pitch dimension Pt of the pair of power terminals 10 is determined by the charging standard, the desired inter-electric wire pitch dimension Pw of the pair of terminal-equipped electric wires 30 can be freely set by appropriately changing the shifting amount of the bolt fastening holes 17.

For example, when the inter-electric wire pitch dimension Pw of the pair of terminal-equipped electric wires 30 is set to be larger than the inter-terminal pitch dimension Pt of the pair of power terminals 10 and the diameters of the power lines 31 are increased, the bolt fastening holes 17 of the pair of power terminals 10 are shifted outward in the left-right direction relative to the central axes X2 of the electric connection portions 11. Therefore, even when the diameters of the power lines 31 are increased for a large current and a large output, the electric wires can be prevented from interfering with each other.

When the inter-electric wire pitch dimension Pw of the pair of terminal-equipped electric wires 30 is set to be smaller than the inter-terminal pitch dimension Pt of the pair of power terminals 10 and the diameters of the power lines 31 are reduced, the bolt fastening holes 17 of the pair of power terminals 10 are shifted inward in the left-right direction relative to the central axes X2 of the electric connection portions 11. Therefore, the diameters alone of the electric wires are reduced for a small current and a small output and the useless space of the rear housing 60 is reduced, and the housing 20 can be made compact.

Further, the connection terminals 41 of the pair of terminal-equipped electric wires 30 can be used in common on right and left sides, and thus no error would occur in the connection operation (crimping or the like) between the connection terminals 41 and the power lines 31. Therefore, the connection terminals 41 and the power lines 31 would not be discarded due to an erroneous connection operation, leading to no manufacturing loss.

Therefore, according to the terminal connection structure in the present embodiment, it is possible to provide the charging inlet 1 that can individually set the inter-terminal pitch dimension Pt and the inter-electric wire pitch dimension Pw.

Figure 12:
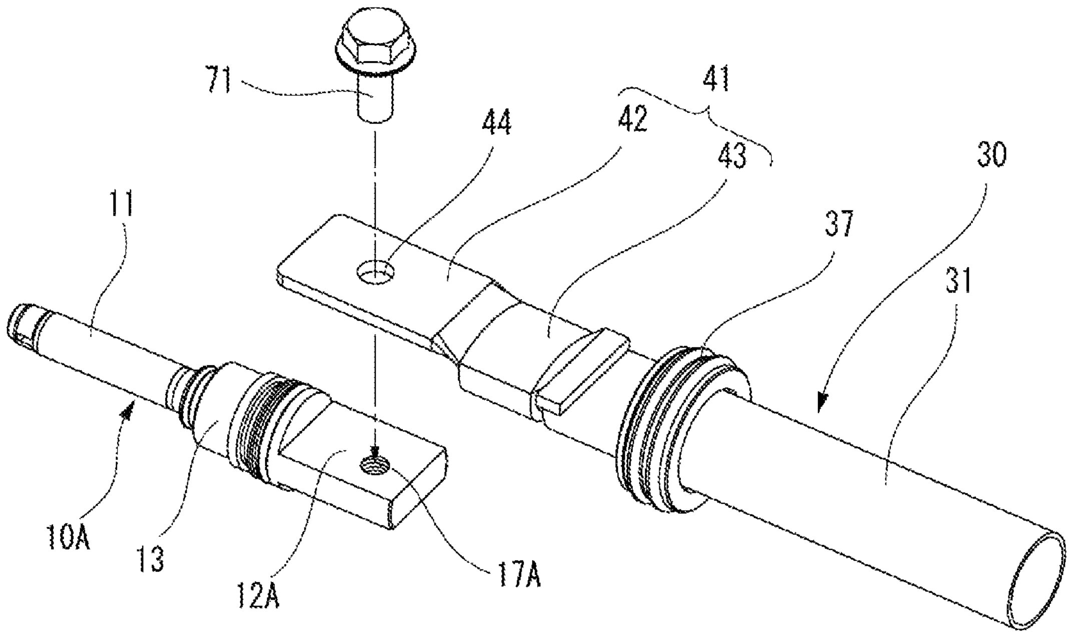
FIG. 12 is a perspective view of a main portion illustrating a state before connection between a terminal and the connection terminal of the terminal-equipped electric wire according to a modification.

FIG. 12 is a perspective view of a main portion illustrating a state before connection between a power terminal 10A and the connection terminal 41 according to a modification.

As illustrated in FIG. 12, the power terminal 10A according to the modification includes an electric wire connection portion 12A having a rectangular plate shape instead of the electric wire connection portion 12 having a semi-columnar shape in the power terminal 10 described above, and other configurations are the same as those of the power terminal 10.

The electric wire connection portion 12A of the power terminal 10A has a bolt fastening hole 17A bored in a plate thickness direction that is a connection portion to which the connection terminal 41 of the terminal-equipped electric wire 30 is connected. The bolt fastening hole 17A is shifted in the left-right direction relative to the central axis X2 of the electric connection portion 11 of the power terminal 10A.

Therefore, similarly to the above-described power terminal 10, the inter-terminal pitch dimension Pt of a pair of power terminals 10A and the inter-electric wire pitch dimension Pw of the pair of terminal-equipped electric wires 30 can be individually set.

When the power terminal 10A according to the modification is rotated by 180 degrees about the central axis X2 of the electric connection portion 11, a shifting arrangement of the bolt fastening hole 17A can be reversed, and thus the pair of power terminals 10A can be used in common.

Figure 13:
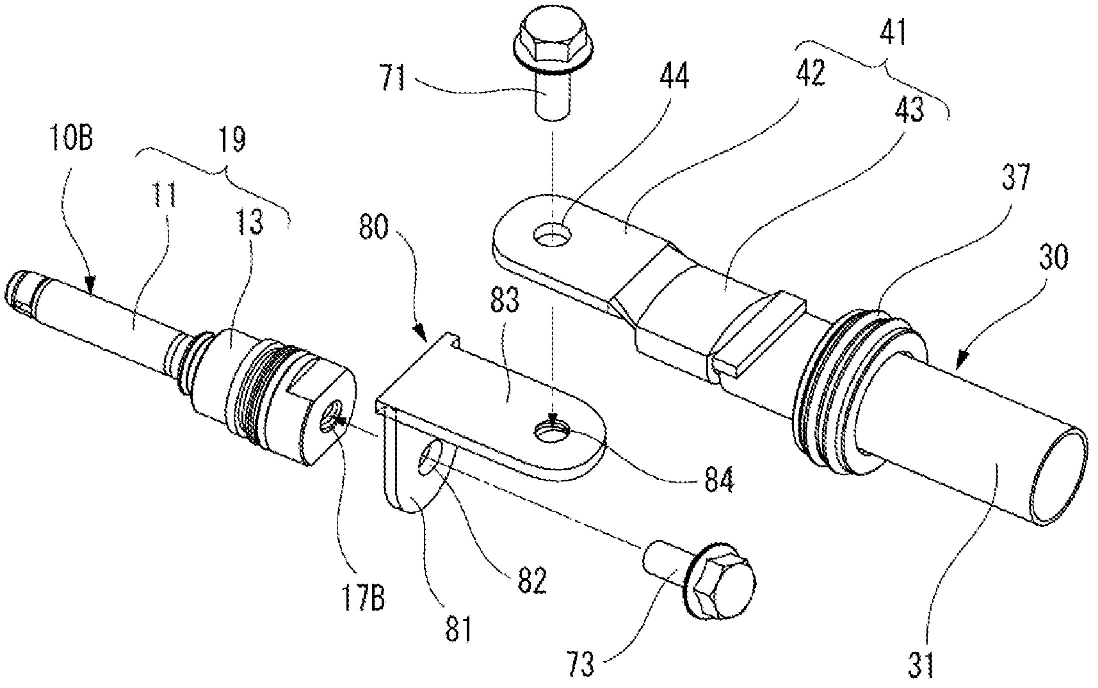
FIG. 13 is a perspective view of a main portion illustrating a state before connection between a terminal and the connection terminal of the terminal-equipped electric wire according to another modification.

FIG. 13 is a perspective view of a main portion illustrating a state before connection between a power terminal 10B and the connection terminal 41 according to another modification.

As illustrated in FIG. 13, the power terminal 10B according to the other modification includes a terminal body 19, which has the flange portion 13 protruding to an outer periphery over a circumferential direction on a rear side of the electric connection portion 11 having a circular rod shape on a top end side, and a offset terminal member 80 that is bolt-fastened to a rear end of the terminal body 19 as an electric wire connection portion to which the connection terminal 41 of the terminal-equipped electric wire 30 is connected.

The offset terminal member 80 is a busbar bent in an L shape and constitutes a connection portion of the electric wire connection portion of the power terminal 10B. The offset terminal member 80 includes a terminal connection portion 81 connected to the rear end of the terminal body 19 and an electric wire connection portion 83 having a bolt fastening hole 84 shifted in the left-right direction relative to a bolt through hole 82 of the terminal connection portion 81.

The terminal connection portion 81 of the offset terminal member 80 is fastened by a bolt 73 screwed into a bolt fastening hole 17B bored in the rear end of the terminal body 19 in a central axial direction. The connection terminal 41 of the terminal-equipped electric wire 30 is bolt-fastened by the bolt 71 screwed into the bolt fastening hole 84 bored in the electric wire connection portion 83 of the offset terminal member 80.

That is, the connection terminal 41 of the terminal-equipped electric wire 30 is electrically connected to the power terminal 10B in a state of being shifted in the left-right direction relative to the central axis X2 of the electric connection portion 11 of the terminal body 19 of the power terminal 10B. Therefore, similarly to the power terminal 10 described above, the power terminal 10B according to the other modification can individually set the inter-terminal pitch dimension Pt of the pair of power terminals 10B and the inter-electric wire pitch dimension Pw of the pair of terminal-equipped electric wires 30.

The terminal body 19 of the power terminal 10B according to the other modification can be used in common by a power terminal used for a horizontal charging inlet in which the power line 31 is drawn to a lateral side of the charging inlet. Here, the power terminal used for the lateral charging inlet is a power terminal to which the terminal-equipped electric wire 30 is connected such that the power line 31 extends to the lateral side of the charging inlet by directly fastening the connection terminal 41 of the terminal-equipped electric wire 30 with the bolt 73 screwed into the bolt fastening hole 17B bored in a rear end.

The present invention is not limited to the above-described embodiments and can be appropriately modified, improved and the like. Materials, shapes, sizes, numbers, arrangement positions, and the like of components in the above-described embodiments are freely selected and are not limited as long as the present invention can be implemented.

For example, a connection portion of an electric wire connection portion of a terminal to which a connection terminal is connected may be a welded portion to which the connection terminal is welded, and the connection terminal may be shifted and welded relative to a central axis of the terminal.

Here, features of the embodiments of the terminal connection structure according to the present invention described above will be briefly summarized and listed below. [1] A terminal connection structure including:

- a housing (20) having a plurality of terminal accommodating chambers (62);
- terminals (power terminals 10) accommodated in the respective terminal accommodating chambers (62); and
- terminal-equipped electric wires (30) in which connection terminals (41) connected to end portions of electric wires (power lines 31) are electrically connected to respective electric wire connection portions (12) of the terminals (power terminals 10), wherein connection portions of the electric wire connection portions (12) to which the connection terminals (41) are connected are shifted relative to central axes (X2) of electric connection portions (11) of the terminals (power terminals 10).

[2] The terminal connection structure according to [1], wherein the connection portions are bolt fastening holes (17) to which the connection terminals (41) are bolt-fastened.

[3] The terminal connection structure according to [1], wherein the connection portions are offset terminal members (80) in which electric wire connection portions (83) are shifted relative to terminal connection portions (81) connected to the terminals (power terminals 10).

[4] The terminal connection structure according to any one of [1] to [3], wherein the housing (20) includes
- a front housing (50) that holds the terminals (power terminals 10),
- a rear housing (60) installed in the front housing (50) and covering connection positions between the connection portions (bolt fastening holes 17, offset terminal members 80) and the connection terminals (41), and
- service holes (63) provided in the rear housing (60) corresponding to the connection positions.

What is claimed is:

1. A terminal connection structure comprising:

a housing having a plurality of terminal accommodating chambers;

a plurality of terminals, each of the terminals is accommodated in a respective one of the terminal accommodating chambers, each of the terminals includes:
- an electric connection portion that is configured to be connected to a counterpart terminal; and
- an electric wire connection portion extending from the electric connection portion; and a plurality of terminal-equipped electric wires, each of the terminal-equipped electric wires includes an electric wire and a connection terminal connected to an end portion of the electric wire, each of the connection terminals is electrically connected to the electric wire connection portion of a respective one of the terminals, wherein the electric wire connection portion has a bolt fastening hole to which the connection terminal is bolt-fastened, the central axis of the electric wire connection portion is coaxial with a central axis of the electric connection portion of the terminal, and the bolt fastening hole of the electric wire connection portion is shifted relative to the central axis of the electric connection portion.

2. The terminal connection structure according to claim 1, wherein the housing includes
- a front housing that holds the terminal,
- a rear housing installed in the front housing and covering a connection position between the connection portion and the connection terminal, and
- a service hole provided in the rear housing corresponding to the connection position.

* * * * *